United States Patent
Gravolin (10) Patent No.: US 6,535,113 B1
(45) Date of Patent: Mar. 18, 2003

(54) ELECTRICAL TELL TALE SYSTEM FOR TRAILERS

(76) Inventor: Dennis R. Gravolin, 271 River Street, Maclean, NSW 2463 (AU)

(*) Notice: Subject to any disclaimer, the term of this patent is extended or adjusted under 35 U.S.C. 154(b) by 0 days.

(21) Appl. No.: 09/926,179
(22) PCT Filed: Sep. 10, 1999
(86) PCT No.: PCT/AU99/00752
§ 371 (c)(1), (2), (4) Date: Sep. 19, 2001
(87) PCT Pub. No.: WO00/15464
PCT Pub. Date: Mar. 23, 2000

(30) Foreign Application Priority Data

Sep. 10, 1998 (AU) .............................. 83226/98

(51) Int. Cl.$^7$ .............................................. G08B 21/00
(52) U.S. Cl. ................. 340/431; 340/458; 340/641; 340/649; 340/459; 340/687; 307/10.8
(58) Field of Search ............... 340/431, 458, 340/641, 642, 687, 333, 459; 307/10.8; 324/504

(56) References Cited

U.S. PATENT DOCUMENTS

| | | | | |
|---|---|---|---|---|
| 3,866,169 A | * | 2/1975 | Haglund | 340/901 |
| 5,442,332 A | * | 8/1995 | Hughes | 200/61.45 R |
| 5,635,843 A | * | 6/1997 | Borland | 324/504 |
| 5,936,407 A | | 8/1999 | Borland | 324/504 |
| 6,218,952 B1 | * | 4/2001 | Borland et al. | 340/641 |

FOREIGN PATENT DOCUMENTS

| | | |
|---|---|---|
| AU | A-86755/91 | 4/1992 |
| GB | 1464303 | 2/1977 |
| GB | 2091504 | 7/1982 |
| GB | 2172456 | 9/1986 |
| GB | 2301234 | 11/1996 |
| GB | 2310965 | 9/1997 |
| WO | WO 88/05003 | 7/1988 |

OTHER PUBLICATIONS

Derwent Abstract Accession No.: 93–326256/41, (Boberg U) Jul. 16, 1993.

* cited by examiner

Primary Examiner—Daniel J. Wu
Assistant Examiner—Son Tang
(74) Attorney, Agent, or Firm—Shlessinger, Arkwright & Garvey LLP (57) ABSTRACT

An electrical tell tale system for trailers that consists of a unique tell tale monitor which is light weight which houses different colored light emitting diodes which define each individual trailer circuit. The tell tale monitor has an attached modular cable and modular plug which is connected by a modular socket to the main control unit. The main control unit has two protruding leads which are connected in series with the vehicles trailer wiring harness by connectors. The system works by scanning the trailer signals passing through the main control unit and specially set, wound resistive current sensing coils, which close a reed switch at the correct current which in turn sends a low voltage signal through the modular connection and through the modular cable to the tell tale monitor which will illuminate a certain light emitting diode to notify if the trailer circuit is operational. If the trailer circuit passing through the main control unit is in-operational, the unit on the tell tale monitor will not light, indicating a fault. If a wrong globe is installed for a particular trailer circuit the light emitting diode on the monitor will flash, also indicating a fault The system is tested by unique current and voltage testing tools.

15 Claims, 10 Drawing Sheets

ELECTRICAL TELL TALE SYSTEM FOR TRAILERS

INTRODUCTION TO THE INVENTION

When any road registered vehicle is hauling any road registered trailer, it is a critical fact of law and safety that the trailer which the vehicle is hauling must have directional and signal electric lighting to communicate the drivers intentions to the external environment around the vehicle. It is even more critical that these trailer lighting systems work and comply in every way to road standards thus meeting the roads and traffic authorities legal requirements. If the legal signal lighting on any road registered trailer is not within compulsory specifications, it is breaking the law. If this vehicle was to be involved in an accident both legal and insurance issues would be of a negative consequence.

Therefore ensuring operation of trailer lamps and their circuits becomes an important issue. Commonly a driver will go to the rear of the trailer to see if the lights are working before they start their journey. This method of checking trailer lights is not practicable whilst the vehicle is in motion. Various fault indicator systems for trailers have been developed for fault detection of trailer circuits, however all forgetting to address simplicity and unity in areas such as installation and operation.

At present there is no universal device which has the ability to be mounted in any vehicle which has a trailer connector and serve the function of warning the driver of the vehicle if all and any trailer circuits such as stop lights, tail or clearance lights, directional indicator lights and units such as electric brake systems, are working correctly or not working correctly whilst the driver is still seated in the driver-seat-and the vehicle in motion or stationary. The Invention documented within is a universal electrical tell tale system for trailers which can be mounted in any vehicle anywhere in the world. The main goal and purpose is to automatically warn the driver of a vehicle that is hauling a trailer, by means of a unique tell tale monitor whether the vehicle be in motion or stationary, that electrical circuits on the trailer are correctly working or malfunctioning when those trailer signals are used.

SUMMARY OF THE INVENTION

The invented system consists of two main units and their electrical connections which can be simply and universally mounted in any vehicle which is equipped with a electrical trailer connection plug. One main unit being a main control unit, situated at the rear of the vehicle, which is connected in series with the vehicle's trailer plug wiring. The second main unit being a tell tale monitor consisting of different coloured light emitting diodes, each for a different trailer circuit. The tell tale monitor is mounted so the driver of the vehicle has visible access to it and is connected to the main control unit by a thin modular, low voltage cable. The two units, their mounting and connection in the vehicle form an electrical tell tale system which by means of a universally mounted tell tale monitor, using light or sound that automatically convey the operating condition of trailer circuits to the driver when those trailer circuits are used. The tell tale system when installed in the vehicle can be tested, by designed testing tools which test systems operation by current and voltage tests.

DETAILED DESCRIPTION OF THE INVENTION

Figure 1:
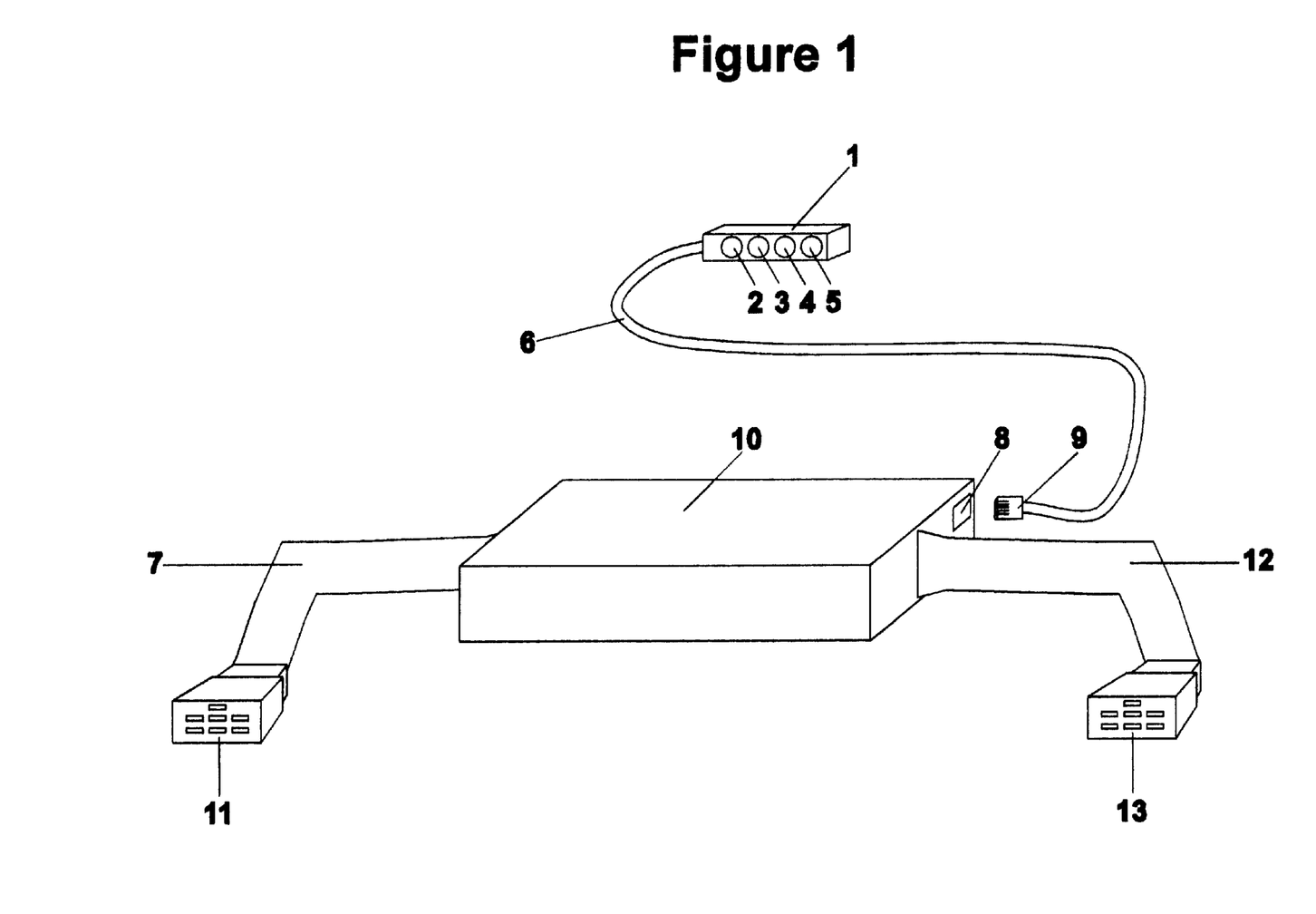
FIG. 1 is a three dimensional pictorial view of the electrical tell tale system showing all main components.

With reference to FIG. 1, the major parts of the system can be seen. The tell tale monitor 1, is a small slim line plastic housing which has four coloured light emitting diodes (LEDs) 2,3,4 and 5 housed in its face. A modular cable 6, is attached to the monitor to provide a signal source and return for the LEDs. Each LED 2 to 5, is a different colour and each colour of the LED represents different trailer circuits. 2 is a blue LED for electric brakes, 3 is a red LED for brakes, 4 is a yellow LED for parking lights 5 is a green LED for right and left turn indicators. The tell tale monitor 1, can have more or less LEDs depending on how many circuits there are to be monitored, however the standard coloring for the main circuits stated is as above. The tell tale monitor 1, is connected to the main control unit 10, by a modular cable 6 and modular connection plug and modular socket 8 and 9.

The main control unit 10 is an epoxy filled plastic housing which holds the main circuitry of the system. The housing has two leads coming out either side 7 and 12. Items 7 and 12 are seven core sheathed 4 mm cabling which the seven cores are distributed into connectors 11 and 13. These connectors 11 and 13, connect to the vehicles trailer wiring harness thuse connecting the main control unit 10 to the vehicle. 11 and 13, can be either universal fitting electrical connector blocks in which slight modification of the vehicles wiring loom is made for the unit to be installed connectors 11 and 13 can also be original equipment manufacturer connector blocks so that the unit will plug straight into the vehicles loom without any modification to the wiring.

The main control unit 10 scans the electrical signal passing through it going to the trailer and if that signal is correct, the main control unit 10 will then send a signal through the modular connection 8 and 9 through the modular cable 6 to illuminate LEDs 2 to 5 to indicate that those trailer circuits are operational when they are being used. If the trailer signal the main control unit 10 scans is incorrect, no LEDs 2 to 5 will light on the tell tale monitor 1.

Figures 2A, 2B:
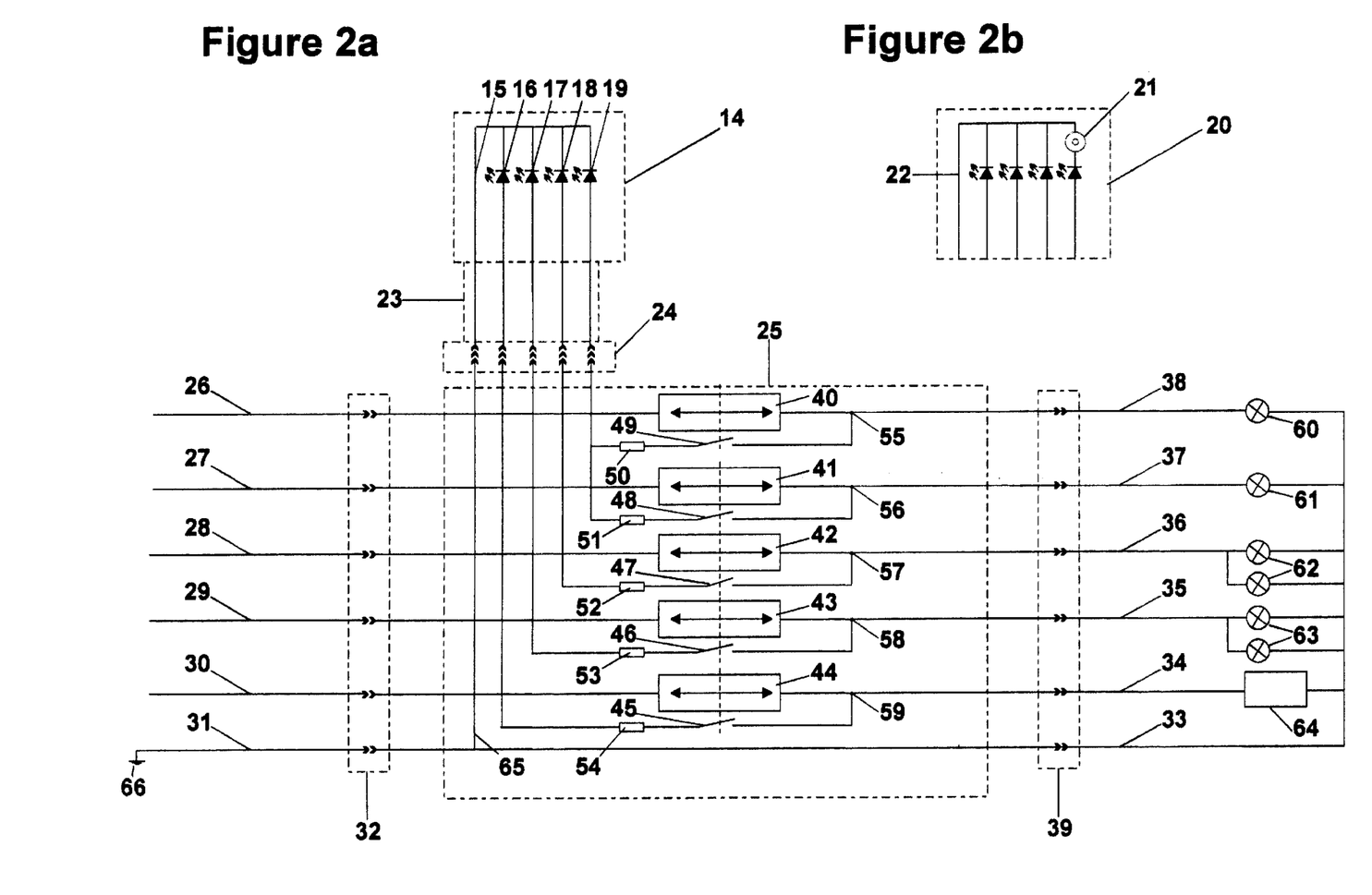
FIG. 2 is a detailed schematic circuit diagram of the electrical tell tale system which shows all main components and all detailed components and shows how the heart of the system operates.

With reference to FIG. 2a description of system components is as follows. The main control unit 25 is connected in series with the vehicles trailer plug wiring via connectors 32 and 39. In this figure connector 32 is the connection of the vehicles trailer signals IN from the vehicle and connector 39 is the connection of the vehicles signals OUT to the trailer. The unit however can be connected reverse without affecting the operation of the system in any way eg 39 could be signal IN and 32 signals OUT. The Tell Tale monitor 14, its earth return 15 and LED's 16,17,18 and 19 are electrically connected to the main control unit 25 via five core modular cable 23 and modular connection 24. 26 to 30 are the electrical circuits from the vehicle going into the main control unit 25. 26 is the right turn signal, 27 is the left turn signal, 28 is park light signal, 29 is brake signal and 30 is the electric brake signal. 34 to 38 are electrical circuits coming out of the main control unit 25 and going to the various trailer circuits 60 to 64. Each signal in corresponds to the signal out, thus 38 is the right turn signal to the trailer, 37 is the left turn signal to the trailer, 36 is the park light signal to the trailer, 35 is the brake signal to the trailer and 34 is the electric brake signal to the trailer. 60 is the right turn light, 61 is the left turn light 62, is the trailers park lights 63, is the trailers brake lights and 64 is the electric brake actuator of the trailer. 33 is the trailers earth return and 31 is the vehicles earth return.

40 to 44 and 45 to 49 together make up the current sensing switch which is a major component of the systems operation. The main circuitry of the current sensing switch 40, 41, 42, 43 and 44 are connected in series between each in and out signal wiring within the main control unit 25. The circuitry of the current sensing switch, 40 to 44 are set specially for each individual trailer circuit 60 to 64 circuit which ensure correctness of the system under operating conditions. 45 to 49 are the contacts of the current sensing switches, which are closed by the current sensing circuitry 40 to 44 when a particular trailer circuit 60 to 64 is operational.

The current sensing circuitry 40 to 44 and the switch contacts 45 to 49 consists of a copper wound coil and reed switch in order to close the switch contacts 45 to 49. The current sensing circuitry 40 to 44 can close the switch contacts 45 to 49 magnetically, by means of a custom wound current sensing coil which consist of different wire sizes and are individually wound for each trailer circuit, and the switch contacts 45 to 49 being of a reed type. Thus the correct amount of magnetic flux will close the reed switch. 50 to 54 are suitable resistors to reduce the voltage going to the LED's 16 to 19 of the tell tale monitor 14. This also provides a safe level of current travelling through the modular cable 23 through the vehicle to the tell tale monitor 14. 55 to 59 are the power connections for the current sensing switch contacts 45 to 49. 66 is the earth connection for the tell tale monitor 14. 67 is the earth of the vehicle Thus the circuits going to the tell tale monitor 14 to light the LEDs 16 to 19 are completed by means of either an magnetic or electronic current sensing switch 40 to 44 and 45 to 49, which will cause the circuit to close when a predetermined setting is reached. The system monitors circuits when they are being used. The system will monitor all circuits 60 to 64 at once if all circuits are being used. The system reports the trailer circuits 60 to 64 operation by the tell tale monitor 14 in which the LEDs 16 to 19 will illuminate when the trailer circuits 60 to 64 that are being used are operational. The LED's 16 to 19 of the tell tale monitor 14 will not illuminate if a the trailer circuits 60 to 64 being used are not operating correctly. The current sensing switches 40 to 44 also have the ability to detect the wrong globe in a trailer lighting circuit, if the globe is of an incorrect current draw the current sensing switch will cause the reed switch to chatter, causing the particular light emitting diode 16 to 19 to flash on the tell tale monitor 14.

An description example is as follows. If the right turn indicator is activated, current will flow from 26, through the current sensing circuitry 40 and to the trailer wiring 38 and indicator globe 60 and then to the earth return 33. As this current flows though the current sensing circuitry 40 the circuitry generates a condition to close the switch 49, current will then flow through connection point 55, through the closed switch 49 through resistor 50 through the modular connector 24 and through the wire of the modular cable 23 to the tell tale monitor 14 to light the LED 19. This will indicate to the driver of the vehicle that the flasher circuit of the trailer is operating correctly. Of course as the flasher circuit is not constant, the LED 19 on the tell tale monitor 14 will flash in sequence with the vehicles flashing rate. If the flasher globe 60 is faulty or there is an open circuit in the line, no current will flow though the circuit, thus the current sensing circuitry 40 will not generate a condition to close the switch contacts 49 giving no current flow thus no illumination to LED 19. By LED 19 not illuminating, it warns the driver that a fault has occurred in the right turn circuit 60 of the trailer. The main control unit 25 monitors all trailer circuits 60 to 64 the same way as described above and reports by the LEDs 16 to 19 Illuminating for and operational circuit or not illuminating, indicating a malfunctioning trailer circuit.

The modular socket 24 of the main control unit allows different tell tale monitors to be connected to the main control unit 25. Different types of monitors can be of such nature as FIG. 2b where a buzzer 21 is connected in the earth return wiring 22. Thus this tell tale monitor 20 warns the driver of the trailer circuits condition by light and sound.

Figure 3:
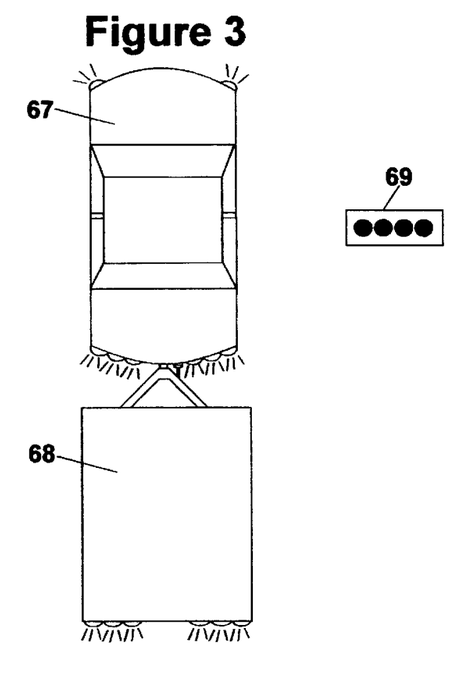
FIG. 3 to FIG. 14 are operating examples of how the system works with different trailer circuits and circuit conditions.
Figure 4:
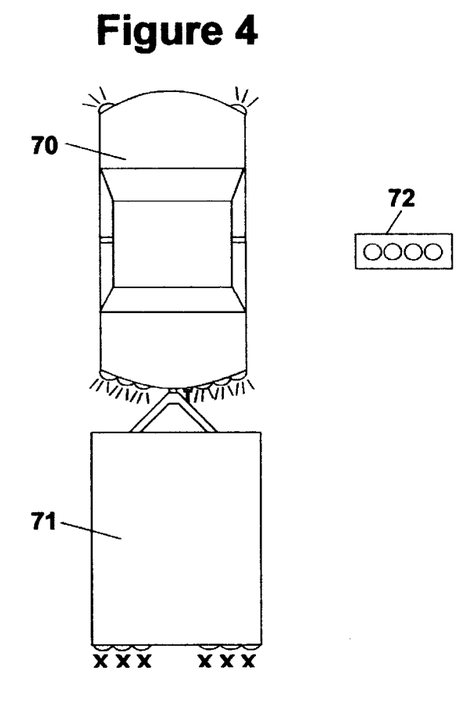
Figure 5:
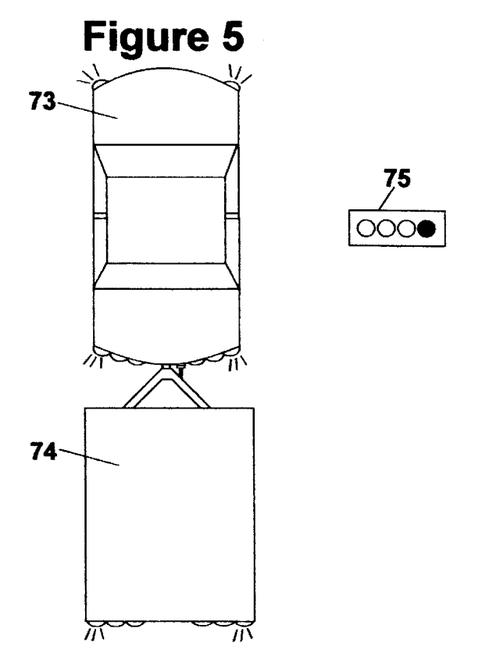
Figure 6:
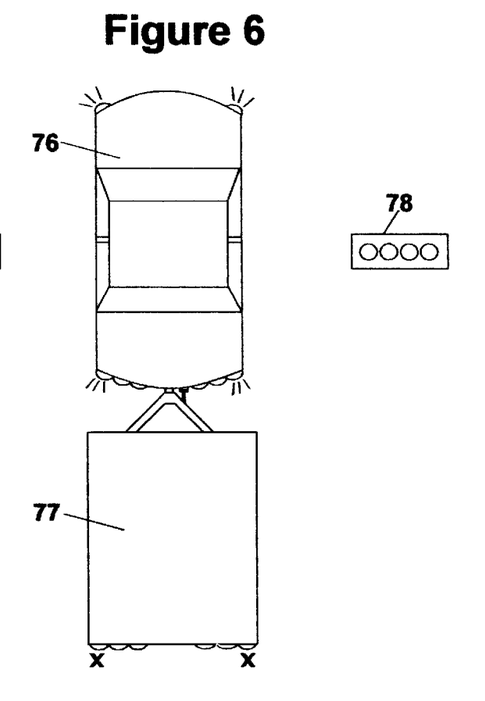
Figure 7:
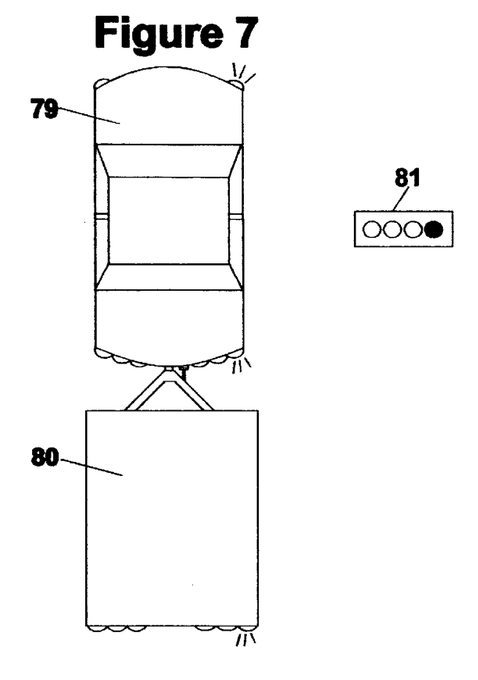
Figure 8:
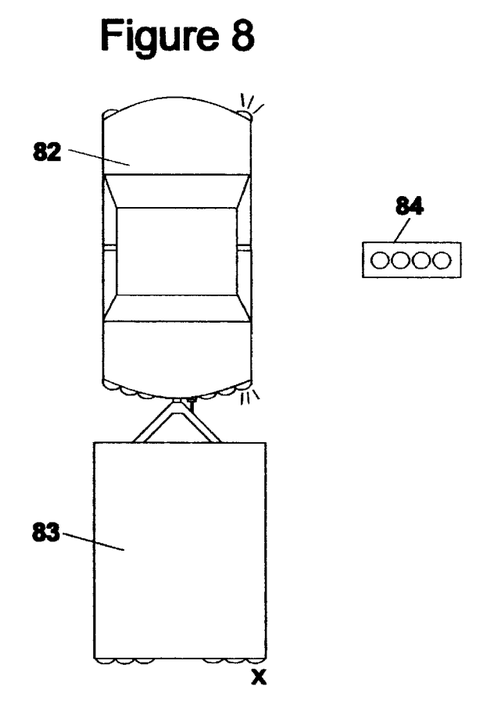

FIGS. 3 to 14 show operating conditions of the tell tale system. When fitted to a vehicle. In FIG. 3, the hauling vehicle 67 has all circuits operational. The hauled trailer 68 also has all lights operational. It can be seen that the tell tale monitor 69 has all LED's illuminated indicating all circuits are operating on the trailer. In FIG. 4 the hauling vehicle 70 has all circuits operational. The hauled trailer 71 has no circuits operational. The tell tale monitor 72 has no LED's illuminated indicating that all trailer circuits are malfunctioning. FIG. 5 shows the hauling vehicle 73 with the hazard circuit operating. The hauled trailer also has the hazard circuit operating, The tell tale monitor 75 has the green turn LED illuminated indicating that the circuit is functioning on the trailer. The hauling vehicle in 76 in FIG. 6 also has the hazard signal on however the hauled trailer 77 has a malfunctioning hazard circuit and thus the green turn LED on the tell tale monitor 78 is not illuminated. FIG. 7 shows the hauling vehicle 79 with the turn indicator on, and the hauled trailer 80 has the also has the turn indicator working, the tell tale monitor 81 is indicating this is the case by having the green turn LED illuminated. FIG. 8 now shows the hauling vehicle 82 with the turn circuit working, however the turn circuit on the hauled trailer 83 is faulty, the tell tale monitor 84 is showing this as no green turn LED is illuminated.

Figure 9:
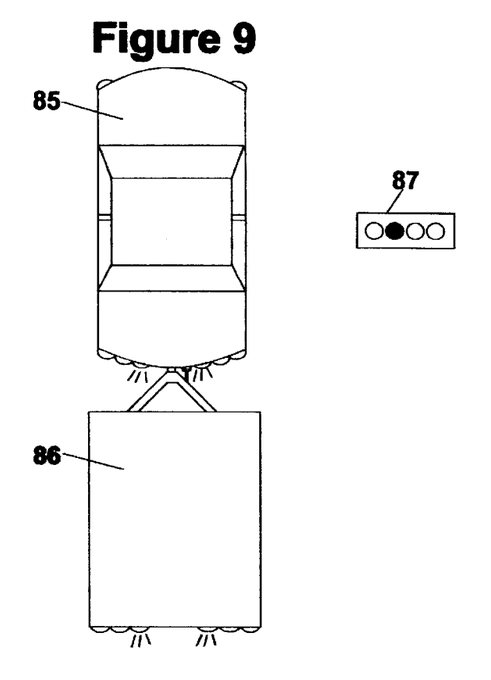
Figure 10:
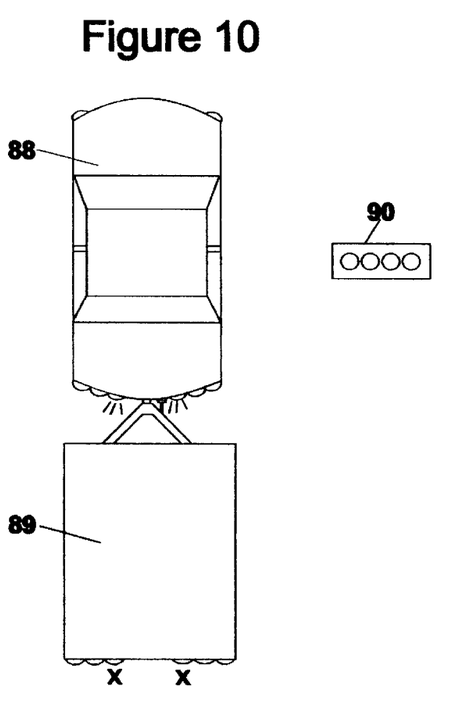
Figure 11:
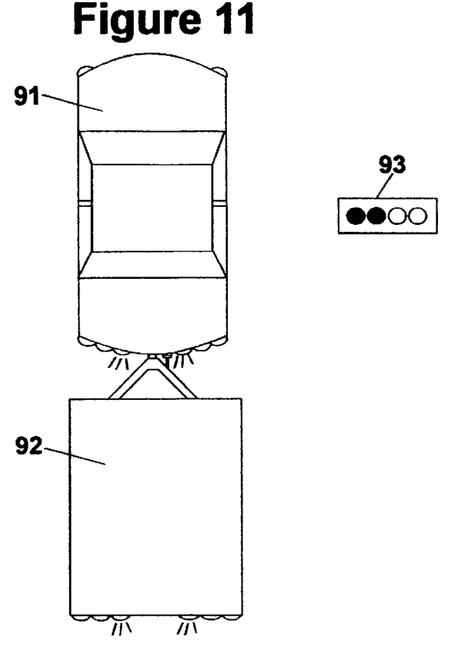
Figure 12:
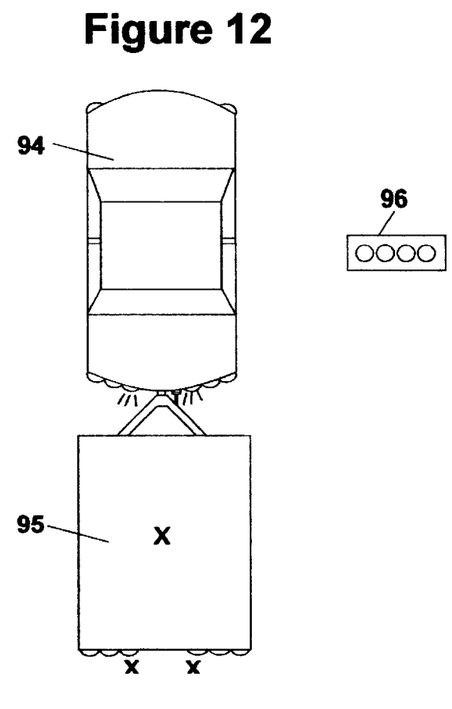
Figure 13:
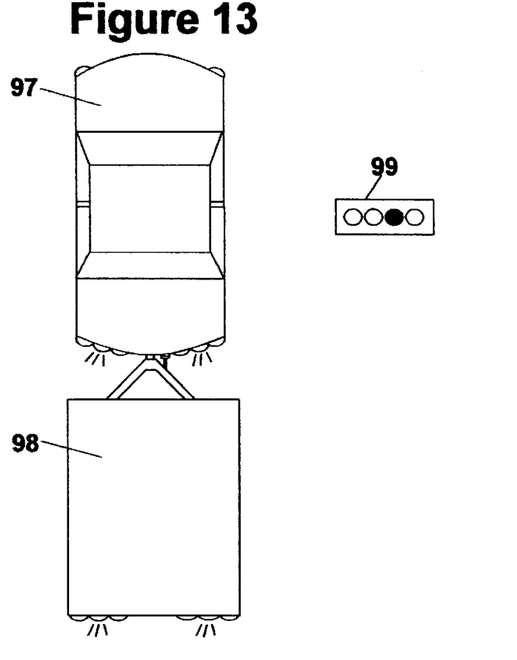
Figure 14:
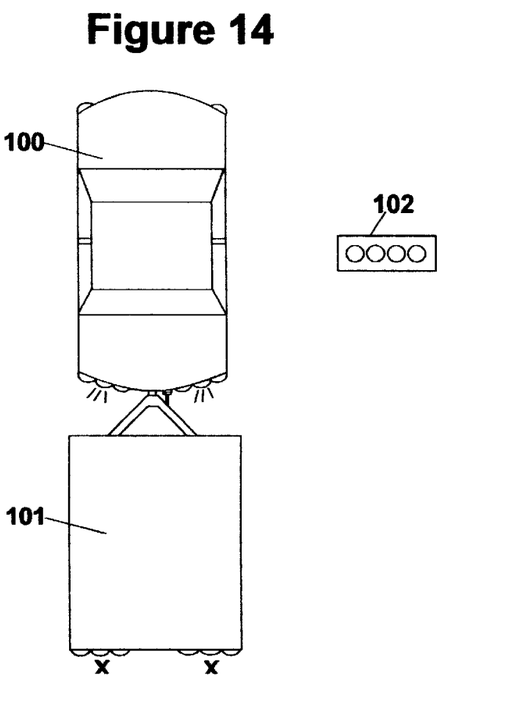

In FIG. 9 the hauling vehicle 85 this time has the brake circuit working, the hauled trailer 86 also has the brake circuit working and the tell tale monitor 87 is indicating that the trailer brake circuit is functioning correctly by illumination of the red brake LED. FIG. 10 shows the hauling vehicle 88 with the brake circuit working and the hauled trailer 89 with the brake circuit not working and thus the tell tale monitor 90 does not have the red brake LED illuminated. The hauling vehicle 91 in FIG. 11 has both brake circuit and electric brake circuits operating, the hauled trailer 92 also has both circuits operating, and the tell tale monitor 93 is showing that the trailer circuits are operating by illumination of the red brake LED and blue electric brake LED. FIG. 12 however shows the hauling vehicle 94 with brake and electric brake circuits working, however the hauled trailer 95 has neither of the se circuits working, and thus the tell tale monitor 96 is showing no illumination of either red brake or blue electric brake LEDs. FIG. 13 show the hauling vehicle 97 again, this time with the park light circuit operating. The hauled trailer 98 also has the park light circuit operational, and this is being reported by the tell tale monitor 99 by illumination of the yellow park LED. FIG. 14 shows the hauling vehicle 100 with the park light circuit on, in this case however the hauled trailer 101 has a faulty park light circuit, and thus no yellow park LED on the tell tale monitor 102 is illuminated.

Figure 15:
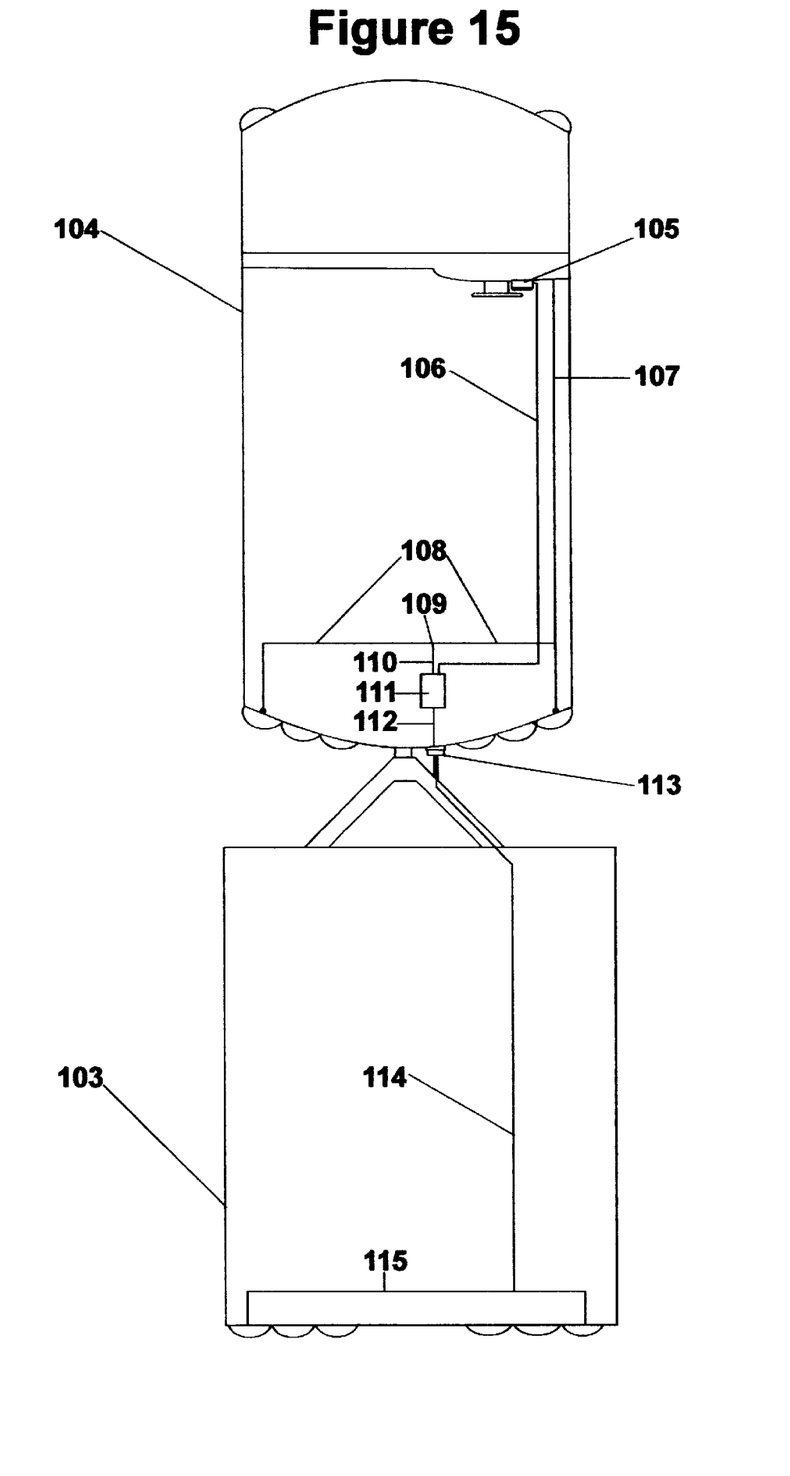
FIG. 15 shows the mounting of the main control unit, the mounting of the tell tale monitor and their connections to the vehicles wiring loom.

With reference to FIG. 15 the mounting, and positioning of the electrical tell tale system can be seen. The complete system is mounted solely in the hauling vehicle 104 and no part or parts of the unit are mounted in the trailer at all 103. The tell tale monitor 105 is mounted on the dashboard anywhere where it looks neat and is practicable, this is a unique design of the invention, flexibility. The tell tale monitor 105 can easily be secured by Velcro tape and thus makes it easy to move wherever the driver desires. 106 is the modular cable which connects the monitor 105 to the main control unit 111. The modular cable 106 is run through the vehicle discreetly, under the trim. The wiring loom of the vehicle to the rear lights 107 has two main connections at the rear of the vehicle. 108 being the loom for the left hand side lights and 109 being the connection for the trailer wiring loom. 110 is the connection of the trailer signals into the main control unit 111 from the vehicle and 112 is the connection of the trailer signals out of the main control unit 111 which go through the trailer plug 113 through the trailer loom 115, to the trailer circuit wiring 115. The signals which pass through the main control unit 111 are not affected or impaired in any way which will affect the correct operation of the circuits on the trailer. Connection points 110 and 112 are can be universal or original equipment manufacture connectors for that particular vehicle. The mounting of this system is unique as the main control unit 110 requires no additional power source to be ran from the front of the vehicle to its position as it works of the wiring that's already there. The connection of the modular cable 106 from the main control unit 110 to the tell tale monitor 105 serves as a flexible and simple unique way of mounting the system.

Figure 16:
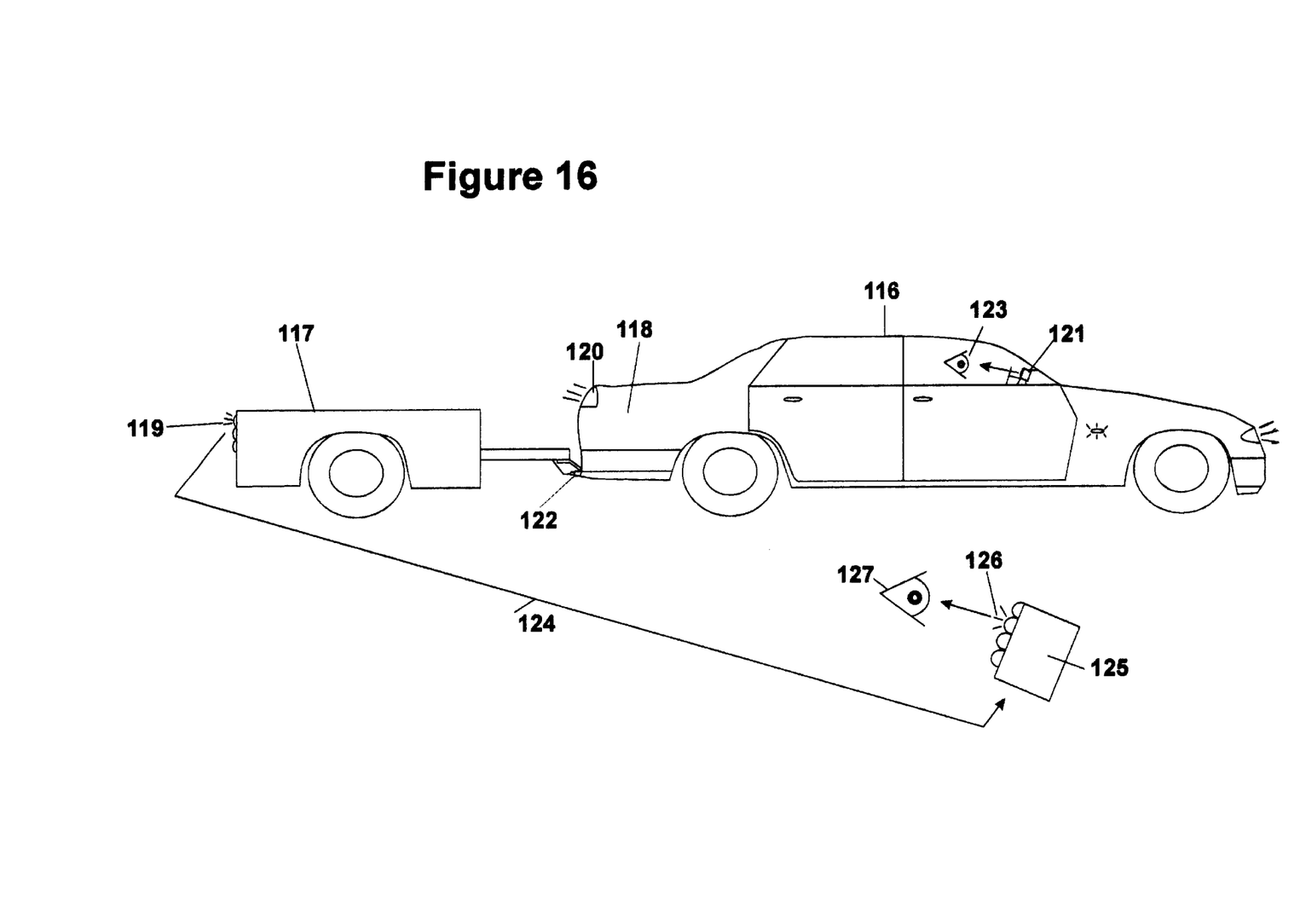
FIG. 16 shows how the system conveys the operational trailer circuit to the driver and also indicates mounting of the system.

In regard to FIG. 16 a driver's eye 123 and 127 is shown to define how the system conveys its message. The hauling vehicle 116 towing the trailer 117 has the right indicator on 120 and this indicator is also working on the trailer 119 the main control unit in the trunk 118 is sensing the correctness of this circuit and sending a signal through the vehicle 124 to the tell tale monitor 121 and 125 which illuminated 126 and makes a visible sign to the drivers eye 123 and 127 that the rear circuit on the trailer is functioning correctly. The illumination 126 of the tell tale monitor is just as noticeable in the day as in the night, so attention can be drawn to the drivers eye 123 and 127 any time the trailer circuits are use providing that the tell tale monitor 121 and 125 is mounted in a suitable and practicable position on or near the dash board of the vehicle.

Figures 17, 18, 19, 20:
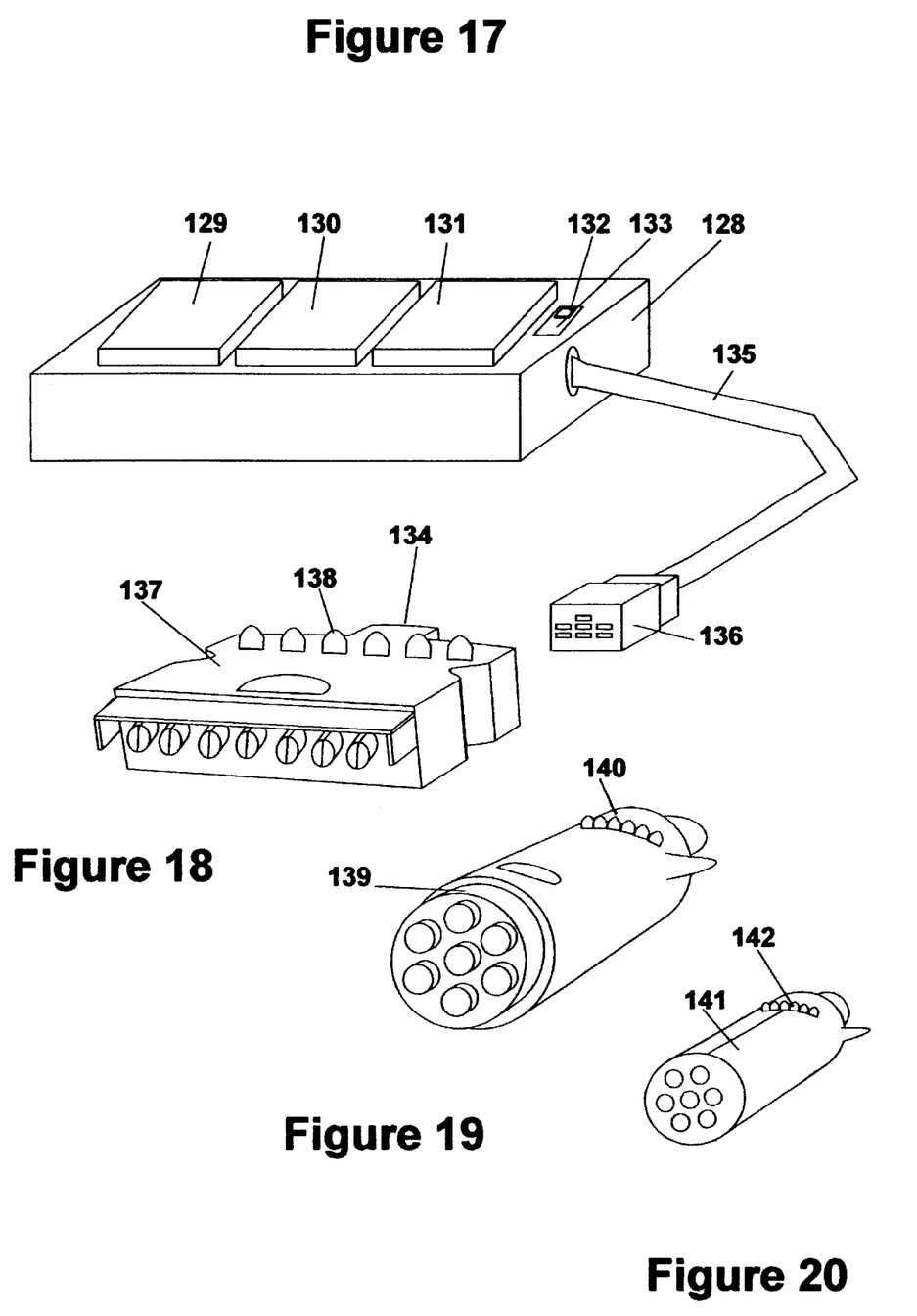
FIG. 17 is a three dimensional pictorial view of the load testing unit for the tell tale system.
FIG. 18 is a three dimensional pictorial view of the seven pin flat type voltage tester for the tell tale system.
FIG. 19 is a three dimensional pictorial view of the large seven pin round type voltage tester for the tell tale system.
FIG. 20 is a three dimensional pictorial view of the small seven pin round type voltage tester for the tell tale system.

FIG. 17 is the current load testing unit of the system. This device, incorporated with FIGS. 18 to 20 are used as diagnosis and testing tools for the tell tale system, FIG. 1. When the tell tale system, FIG. 1 is connected to the vehicle, FIG. 15 the load testing unit, FIG. 17 is connected to one of the voltage testing units, FIGS. 18 to 20 and applies a load on all monitored circuits of the tell tale system, FIG. 1, when those circuits are operated. This serves as an accurate test measure when finding faults or testing the system with no trailer. The current load tester is housed in a plastic box 128 which contains load devices such as bulbs or resistors and has three transparent lenses 129, 130, 131 which illuminate when current is passed through the different circuits. 133 is a switch that changes the load voltage and thus current. The switch can be slid down to 133 which will change the load voltage to 24 volts, the default position of the switch is for a load voltage of 12 volts. The current load testing unit 128 has a cable coming out from its box 135 which is sheathed 7 core 4 mm cable that is distributed and terminated at a male connector block 136. This male connector block 136 is designed to plug into 134, a female connector block of the voltage testing unit, FIG. 18. The voltage testing unit 137 is a standard pre-manufactured 7 pin flat male type trailer connector such as manufactured by the company Utilux. The unit has circuitry housed inside the body and an array of light emitting diodes 138 protruding out of the top of the unit. The voltage testing unit 137 is designed to plug into the trailer plug of the vehicle and test the voltage of the various trailer circuits at the vehicles trailer connector when those circuits are used. If the circuits voltage at the trailer plug is correct, the correct LED will come illuminate, or a buzzer sound indicating that the voltage to that circuit is correct. Thus this testing unit is used in conjunction with the electrical tell tale system to ensure that there is no fault in the trailer connector before or after the tell tale system is installed or if a fault in the system is being diagnosed.

FIG. 19 shows a standard seven pin large trailer connector 139 and LED array 140, this is the same device as FIG. 18 however the actual plug type is of a different standard, thus this unit can test a different type connector. FIG. 20 is again the same device as FIG. 18, however this is a small seven pin round plug, again designed to test a different style of trailer connector. FIG. 18 to 20 are all pre manufactured standard type trailer connectors which have been modified to form the current testing devices.

Figures 21A, 21B:
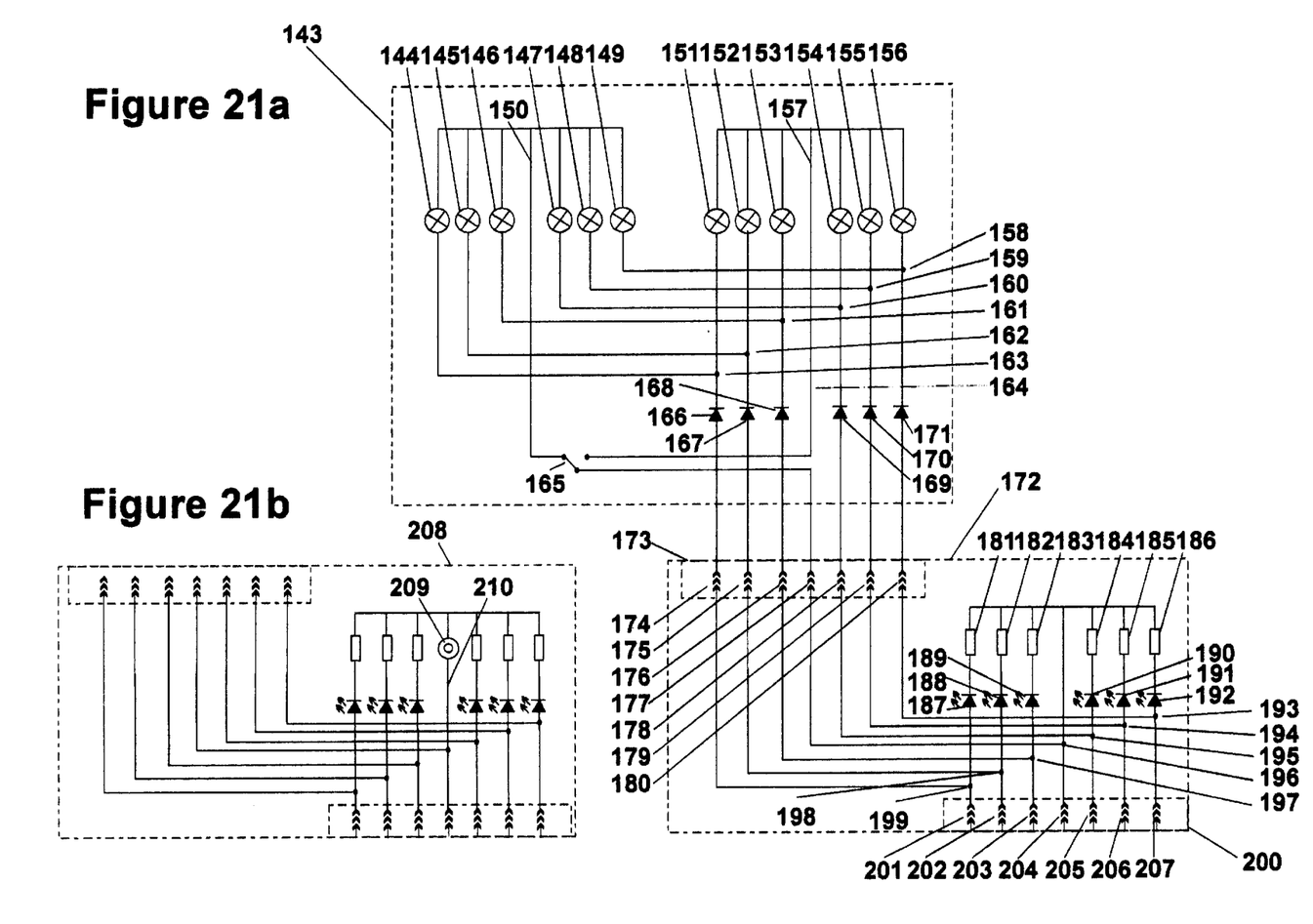
FIG. 21a is a circuit schematic of the load tester and voltage tester connected together showing all components.
FIG. 21b is a circuit schematic of the voltage testing unit showing the buzzer version of the tester.

The operation of the load current testing device and the voltage testing device for the tell tale system can be depicted from the schematic of FIG. 21a The housing of the load device 143 consists of two load sets 144 to 149 and 151 to 156. These load sets are for 12 and 24 volt loads which are selected by switch 165 which changes the main earth return 164. The load sets 144 to 149 and 151 to 156 are either bulbs or resistors, which are set to the same load as the standard used on a particular trailer circuit in real conditions.

150 and 157 are the earth returns for each load set. The two load sets 144 to 149 and 151 to 156 are connected in parallel with each other at points 158 to 163. Diodes, 168 to 171 prevent any feed back through other trailer circuits while a particular trailer circuit is being tested. The load testing unit 143 is connected to the rear to the voltage testing unit 172 by connector block 173, and connection terminals 174 to 180. The voltage testing unit consists of a front connector 200 and connection pins 201 to 207 which conform to international standards for trailer connectors. Resistors 181 to 186 limit the current of both 12 and 24 voltages to the unit, thus protecting the light emitting diodes 189 to 192. These diodes are different colours for each different trailer circuit and light when the correct voltage is passed through them indicating that the particular trailer circuit is getting to the vehicles trailer connector. The connector block 173 of the voltage testing unit which is connected to the load testing unit is connected in parallel with the LED circuit at points 193 to 199, this allows for both voltage and current to be tested at the same time when testing the tell tale system or diagnosing a possible fault with the system.

FIG. 21b is a second type of voltage testing unit 208, which tests the voltage of the vehicles trailer connector the same way as 172 in FIG. 21a, however this voltage testing unit 208 incorporates a buzzer 209 in its earth return 210 and thus conveys the correct voltage level when testing by light as well as sound.

Figure 22A:
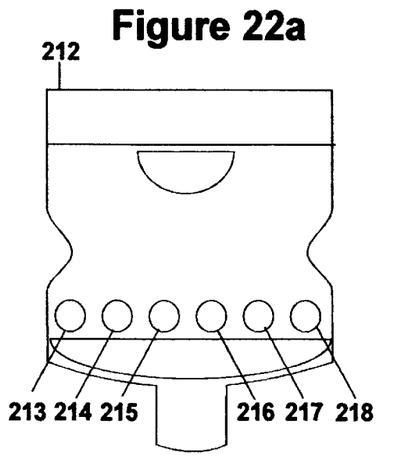
FIG. 22a is a top view of seven pin flat type voltage testing unit.
Figure 22B:
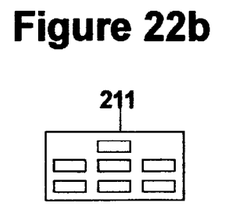
FIG. 22b is the standard rear connection plug for seven pin flat type voltage testing unit.

FIG. 22a shows the top view of the voltage testing unit 212 and its LED array 213 to 218. The circuits and colours defining the LED in the test unit 212 are, 213 left turn circuit, green, 214 stop circuit, red, 215 auxiliary circuit one, white, 216 auxiliary circuit two, blue, 217 tail circuit, yellow and 218 right turn circuit, green. These circuit and colour configurations also apply to FIG. 23a, 224 to 227 and FIG. 24a 231 to 236 in the respective ascending order as FIG. 22a, 213 to 218. FIG. 22b is the rear connector 211 of the voltage testing unit that connects with the current testing unit. The standard pin out configuration for this type of test unit is referenced at FIG. 22c which shows the standard trailer wiring pin out and connector type 219 for the voltage testing unit in FIG. 22a.

Figure 22C:
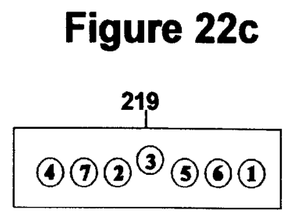
FIG. 22c is the standard front connection plug for seven pin flat type voltage testing unit.
Figure 23A:
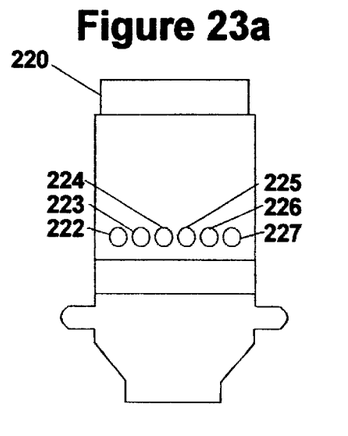
FIG. 23a is a top view of the large seven pin round type voltage testing unit.
Figure 23B:
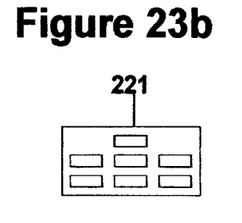
FIG. 23b is the standard rear connection plug for the large seven pin round voltage testing unit.
Figure 23C:
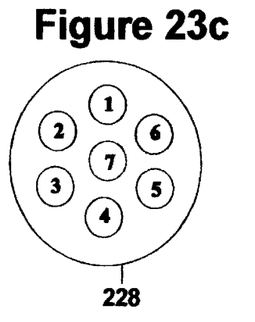
FIG. 23c is the standard front connection plug for the large seven pin round voltage testing unit.
Figure 24A:
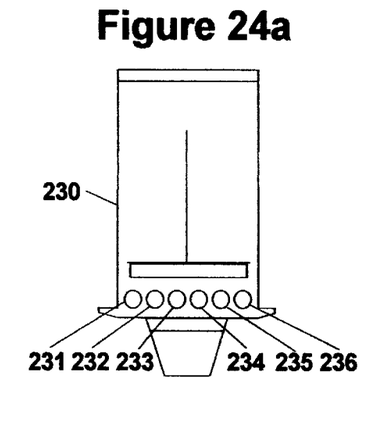
FIG. 24a is the top view of the small seven pin round voltage testing unit.
Figure 24B:
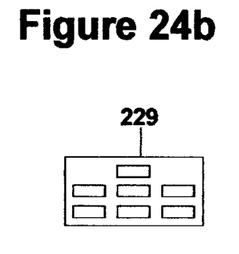
FIG. 24b is the standard rear connection plug for the small seven pin round voltage testing unit.
Figure 24C:
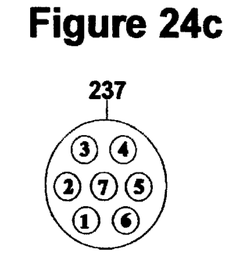
FIG. 24c is the standard front connection plug for the small seven pin round voltage testing unit.

The circuits that correspond to the pin out connections for FIGS. 22c, 23c, 24c in 219,228 and 237 respectively are as follows. 1 left turn circuit, 2 auxiliary one circuit, 3 earth return, 4 right turn circuit, 5 auxiliary two circuit, 6, brake circuit, and 7 park circuit. FIG. 23a shows the a top view of the seven pin round large voltage testing connector 220, and its position of the LED array 224 to 227, the rear connector 211 of this voltage testing unit is shown in FIG. 23b which connects to the voltage testing unit, FIG. 17, and FIG. 23c shows the front connector which conforms to the standard pin out as mentioned above for this type of the voltage testing unit. FIG. 24a shows a top view of the small seven pin round voltage testing unit 230 and the position of its LED array 231 to 236 FIG. 24b shows the rear connector 229 which connects to the load current testing unit as in FIG. 17 and FIG. 24c shows the pin out and wiring standard 237 for this type of the voltage testing unit also mentioned above.

What is claimed is:

1. An electrical tell tale system for trailer circuits that can be installed to a hauling vehicle having a trailer wiring, comprising:
    a) a main control unit having first and second connectors for being installed in series between the vehicles's trailer wiring and the trailer circuits;
    b) a tell tale monitor connected to said control unit and positioned in the vehicle to be visible to the driver;
    c) said tell tale monitor including different colored light emitting diodes, each color of said light emitting diodes recognizing a particular trailer circuit to warn the driver of the vehicle of the operating conditions of the trailer circuits;
    d) said control unit including a plurality of coils connected in series between said first and second connectors such that each coil is connected in series between respective trailer wiring and trailer circuit, such that the respective coil is energized when the respective trailer wiring and trailer circuit are energized;
    e) said control unit including a plurality of reed switches, each switch being connected in parallel with a respective coil such that said switch is activated when its respective coil is energized, each switch being connected to a respective diode to activate the respective diode when the respective coil is energized to inform the driver that the respective trailer circuit is operating;
    f) said control unit including a plurality of resistors each of which is connected in series with a respective reed switch to limit the current through said switch in case of a short; and
    g) said first and second connectors are configured such that said first and second connectors may be reversely connected to the vehicle's trailer wiring and the trailer circuits without affecting the operation of the system.

2. An electrical tell tale system as in claim 1, wherein said monitor is remote from said control unit.

3. An electrical tell tale system as in claim 1, wherein each of said switches operates intermittently when activated if an incorrect wattage globe is used in a respective trailer circuit, thereby causing the respective light emitting diode to flash.

4. An electrical tell tale system as in claim 1, wherein each of said reed switches is disposed within a respective coil.

5. An electrical tell tale system as in claim 1, wherein said main control unit is sealed in a plastic housing, filled with epoxy resin.

6. An electrical tell tale system as in claim 1, wherein said control unit includes a modular socket for connection to a modular plug carried by said tell tale monitor.

7. An electrical tell tale system as in claim 1, wherein said connectors are connector blocks.

8. An electrical tell tale system as in claim 1, wherein said different colored diodes are blue, red, yellow and green.

9. An electrical tell tale system as in claim 8, wherein:
    a) said trailer circuits include an electric brake circuit; and
    b) said blue diode indicates the condition of said electric brake circuit.

10. An electrical tell tale system as in claim 8, wherein:
    a) said trailer circuits include a brake lights circuit; and
    b) said red diode indicates the condition of said brake lights circuit.

11. An electrical tell tale system as in claim 8, wherein:
    a) said trailer circuits include a turn indicator circuit; and
    b) said green diode indicates the condition of said turn indicator circuit.

12. An electrical tell tale system as in claim 8, wherein:
    a) said trailer circuits include a parking light circuit; and
    b) said yellow diode indicates the condition of said parking light circuit.

13. An electrical tell tale system as in claim 1, wherein said tell tale monitor includes a buzzer.

14. An electrical tell tale system as in claim 1, wherein said tell tale monitor is compact such as to be easily mounted anywhere in the vehicle in view of the driver.

15. An electrical tell tale system as in claim 1, wherein said light emitting diodes are visible day or night.

* * * * *